(12) United States Patent
Weiss

(10) Patent No.: US 12,704,140 B2
(45) Date of Patent: Aug. 11, 2026

(54) APPARATUS FOR A MODULAR COMPONENT WITH A MOUNTING MECHANISM AND METHOD OF USE

(71) Applicant: BHN Holding LLC, West Palm Beach, FL (US)

(72) Inventor: Joel Weiss, West Palm Beach, FL (US)

(73) Assignee: BHN Holding LLC, West Palm Beach, FL (US)

( * ) Notice: Subject to any disclaimer, the term of this patent is extended or adjusted under 35 U.S.C. 154(b) by 0 days.

(21) Appl. No.: 18/585,409

(22) Filed: Feb. 23, 2024

(65) Prior Publication Data

US 2025/0271011 A1 Aug. 28, 2025

(51) Int. Cl.
*F16B 5/12* (2006.01)
*A47B 47/00* (2006.01)
(Continued)

(52) U.S. Cl.
CPC .......... *F16B 5/123* (2013.01); *A47B 47/0091* (2013.01); *A47B 57/34* (2013.01); *A47B 96/06* (2013.01); *A47B 96/14* (2013.01)

(58) Field of Classification Search
CPC ........... A47B 47/0083; A47B 47/0091; A47B 47/021; A47B 47/027; A47B 47/028; A47B 57/06; A47B 57/08; A47B 57/10; A47B 57/16; A47B 57/20; A47B 57/22; A47B 57/30; A47B 57/32; A47B 57/34; A47B 57/40; A47B 57/48; A47B 57/482; A47B 57/485; A47B 57/50; A47B 88/43; A47B 88/044; A47B 96/024; A47B 96/06;
(Continued)

(56) References Cited

U.S. PATENT DOCUMENTS 2,620,251 A * 12/1952 Restivo .................. A47B 47/00 312/257.1
2,620,252 A * 12/1952 Restivo .................. A47B 88/43 312/317.1
(Continued)

FOREIGN PATENT DOCUMENTS

DE 3400960 A1 * 7/1985
DE 10234536 C1 * 12/2003 ............ A47B 47/05
(Continued)

*Primary Examiner* — Andrew Roersma
(74) *Attorney, Agent, or Firm* — CALDWELL LLC

(57) ABSTRACT

An apparatus for a modular component with a mounting mechanism. The apparatus includes at least a modular component including at least a casing, wherein the at least a casing is removably attached to the at least a modular component; a rail, wherein the rail includes a proximal and a distal end. The proximal end includes a plurality of apparatus, whereas the distal end comprises a mating surface. The apparatus includes a bracket comprising a first engagement member and a second engagement member, wherein the first engagement member is configured to engage the plurality of apertures of the rail to removably secure the bracket to the rail. The apparatus also includes a plurality of structural components. The plurality of structural components also includes a second structural component, the second structural component comprising a plurality of slots configured to receive the mating surface of the rail.

26 Claims, 8 Drawing Sheets

(51) Int. Cl.

| | |
|---|---|
| ***A47B 57/34*** | (2006.01) |
| ***A47B 96/06*** | (2006.01) |
| ***A47B 96/14*** | (2006.01) |

(58) Field of Classification Search

CPC ... A47B 96/068; A47B 96/14; A47B 96/1408; A47B 96/1416; A47B 96/1441; A47B 2220/0036; F16B 5/123

See application file for complete search history.

(56) References Cited

U.S. PATENT DOCUMENTS

| | | | | |
|---|---|---|---|---|
| 3,716,284 | A * | 2/1973 | Vogt | A47B 88/43 312/351 |
| 4,469,031 | A * | 9/1984 | Haycock | A47B 57/34 108/108 |
| 5,349,909 | A * | 9/1994 | Smit | F16B 12/14 108/193 |
| 5,921,647 | A * | 7/1999 | Schneider | A47B 47/05 211/187 |
| 5,951,133 | A * | 9/1999 | Dittberner | A47B 88/944 312/348.4 |
| 6,053,585 | A * | 4/2000 | Osen | E06B 5/006 40/606.08 |
| 6,622,873 | B2 * | 9/2003 | Hegrenes | H05K 7/183 211/187 |
| 9,386,847 | B1 * | 7/2016 | Jeffries | A47B 88/417 |
| 10,271,648 | B2 | 4/2019 | Harder | |
| 10,314,394 | B2 | 6/2019 | Chen | |
| 10,342,336 | B2 * | 7/2019 | Chen | A47B 57/545 |
| 11,553,791 | B2 * | 1/2023 | Briosi | A47B 96/1441 |
| 11,571,067 | B1 * | 2/2023 | Signer | A47B 96/1408 |
| 2002/0195029 | A1 | 12/2002 | Walton | |
| 2005/0036830 | A1 * | 2/2005 | Hall | F16B 9/058 403/188 |
| 2007/0039913 | A1 * | 2/2007 | Chen | A47B 88/43 211/192 |
| 2010/0200716 | A1 * | 8/2010 | White, III | A47B 96/06 29/238 |
| 2013/0062300 | A1 * | 3/2013 | Drake | A47F 5/0884 211/183 |
| 2013/0264924 | A1 * | 10/2013 | Tusk | A47B 47/0041 312/265.5 |
| 2018/0146776 | A1 * | 5/2018 | Lye | A47B 47/0091 |
| 2018/0249827 | A1 * | 9/2018 | Kim | F24F 1/0358 |
| 2018/0295988 | A1 * | 10/2018 | Harder | A47B 88/407 |
| 2019/0367263 | A1 * | 12/2019 | Chabot | B65D 90/0046 |
| 2023/0301428 | A1 * | 9/2023 | Soytürk | A47B 88/43 |

FOREIGN PATENT DOCUMENTS

| | | | | |
|---|---|---|---|---|
| FR | 2145882 | A5 * | 2/1973 | |
| FR | 2862504 | A1 * | 5/2005 | A47B 57/04 |
| GB | 803676 | A * | 10/1958 | A47B 49/004 |
| GB | 1368089 | A * | 9/1974 | A47B 57/402 |
| JP | 2016077320 | A * | 5/2016 | |

* cited by examiner

APPARATUS FOR A MODULAR COMPONENT WITH A MOUNTING MECHANISM AND METHOD OF USE

FIELD OF THE INVENTION

The present invention generally relates to the field of modular furniture assembly and customization. In particular, the present invention is directed to an apparatus and a method of use for a modular component with a mounting mechanism.

BACKGROUND

Traditional storage systems have been widely used in various settings to provide storage and organization solutions. These systems typically consist of fixed shelves or drawers fixed dimensions, limiting their adaptability to accommodate items of different sizes. Conventional systems often lack the flexibility required to meet changing storage needs. Moreover, existing storage systems require complicated assembly processes, specialized tools, or additional hardware to adjust the shelf heights. Additionally, some systems compromise stability and durability when reconfigured, leading to potential safety concerns.

SUMMARY OF THE DISCLOSURE

In an aspect, a modular component with a mounting mechanism for furniture is disclosed. The apparatus includes at least a modular component, wherein the at least a modular component includes at least a casing, wherein the at least a casing is removably attached to the at least a modular component; a rail, wherein the rail includes a proximal and a distal end. The proximal end includes a plurality of apparatus, whereas the distal end comprises a mating surface. The apparatus includes a bracket comprising a first engagement member and a second engagement member, wherein the first engagement member is configured to engage the plurality of apertures of the rail to removably secure the bracket to the rail. The apparatus also includes a plurality of structural components. The plurality of structural components includes a first structural component, the first structural component comprising a plurality of notches configured to receive at least a portion of the second engagement member of the bracket. The plurality of structural components also includes a second structural component, the second structural component comprising a plurality of slots configured to receive the mating surface of the rail.

In another aspect, a method of use for a modular component with a mounting mechanism for furniture. The method includes removably attaching at least a casing to at least a modular component; connecting a rail to a plurality of structural components, wherein the rail comprises a proximal end comprising a plurality of apertures and a distal end comprising a mating surface. The method includes removably securing a bracket to the rail, wherein the bracket comprises a first engagement member and a second engagement member, wherein the first engagement member is configured to engage the plurality of apertures of the rail to removably secure the bracket to the rail. The method includes structuring a piece of furniture using the plurality of structural components. The plurality of structural components includes a first structural component, the first structural component comprising a plurality of notches configured to receive at least a portion of the second engagement member of the bracket. The plurality of structural components also includes a second structural component, the second structural component comprising a plurality of slots configured to receive the mating surface of the rail.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to a mounting apparatus for furniture. The apparatus includes a rail, wherein the rail includes a proximal and a distal end. The proximal end includes a plurality of apparatus, whereas the distal end comprises a mating surface. The apparatus includes a bracket comprising a first engagement member and a second engagement member, wherein the first engagement member is configured to engage the plurality of apertures of the rail to removably secure the bracket to the rail. The apparatus also includes a plurality of structural components. The plurality of structural components includes a first structural component, the first structural component comprising a plurality of notches configured to receive at least a portion of the second engagement member of the bracket. The plurality of structural components also includes a second structural component, the second structural component comprising a plurality of slots configured to receive the mating surface of the rail. Exemplary embodiments illustrating aspects of the present disclosure are described below in the context of several specific examples.

Figure 1A:
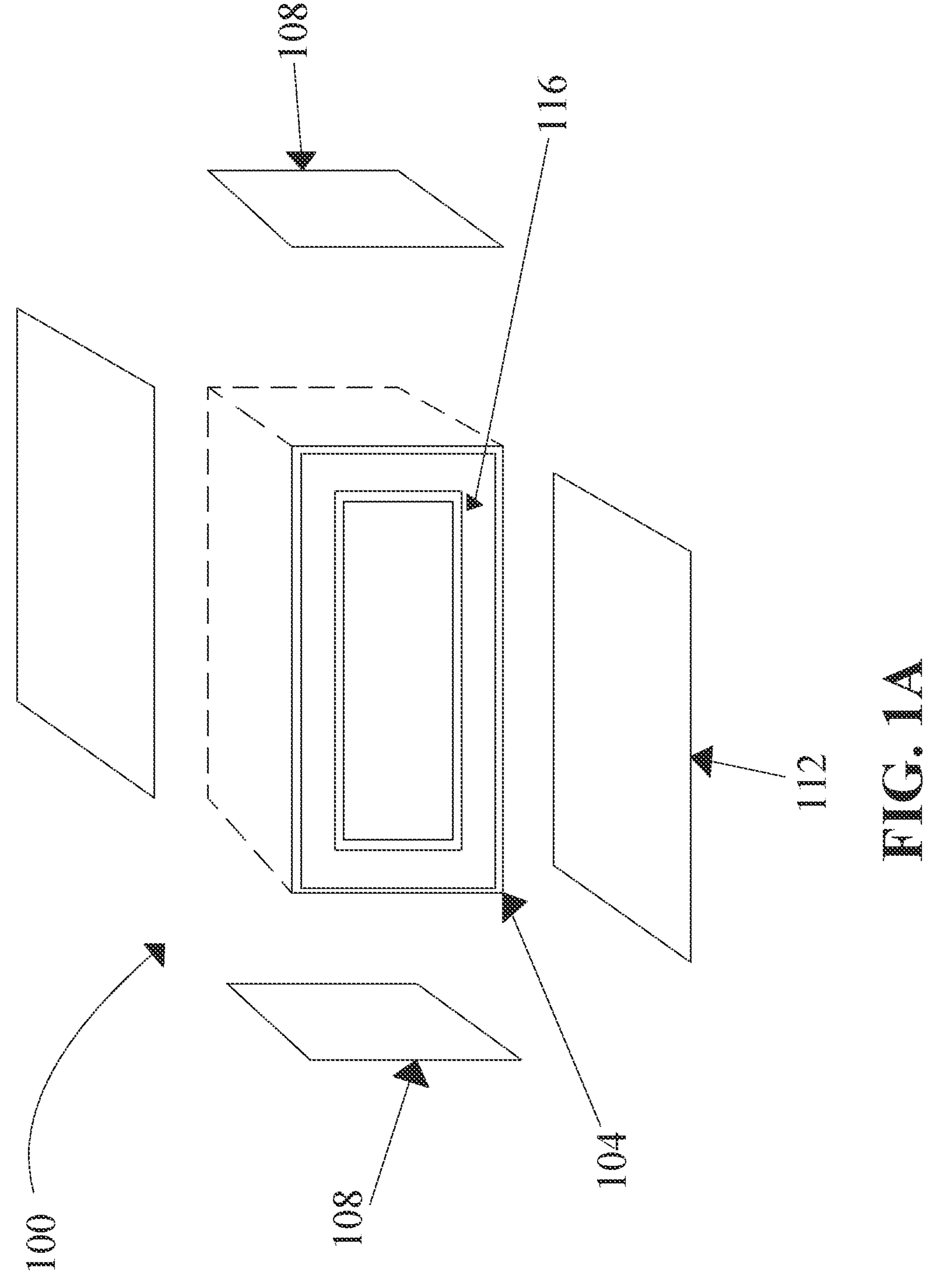
FIGS. 1A-1C is an exemplary embodiment of a modular component with a mounting mechanism for furniture in accordance with one or more embodiments of the present disclosure.
Figure 1B:
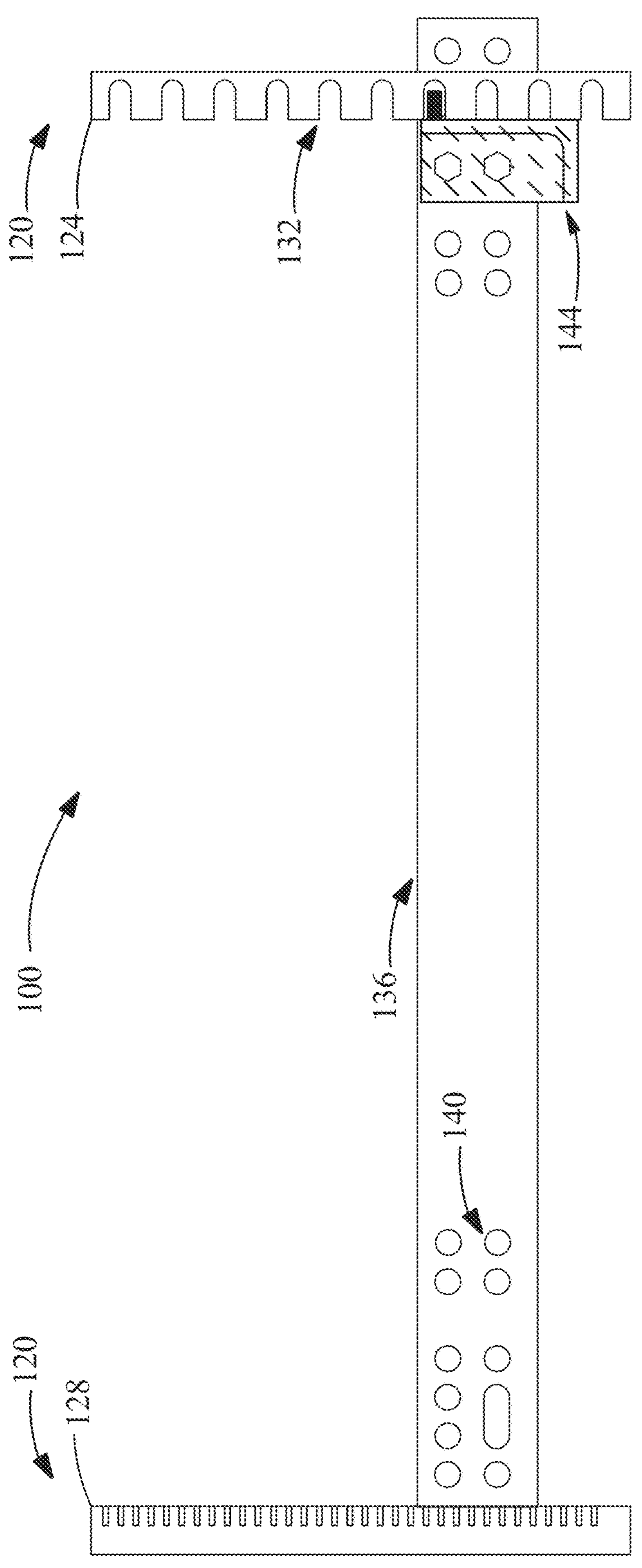
Figure 1C:
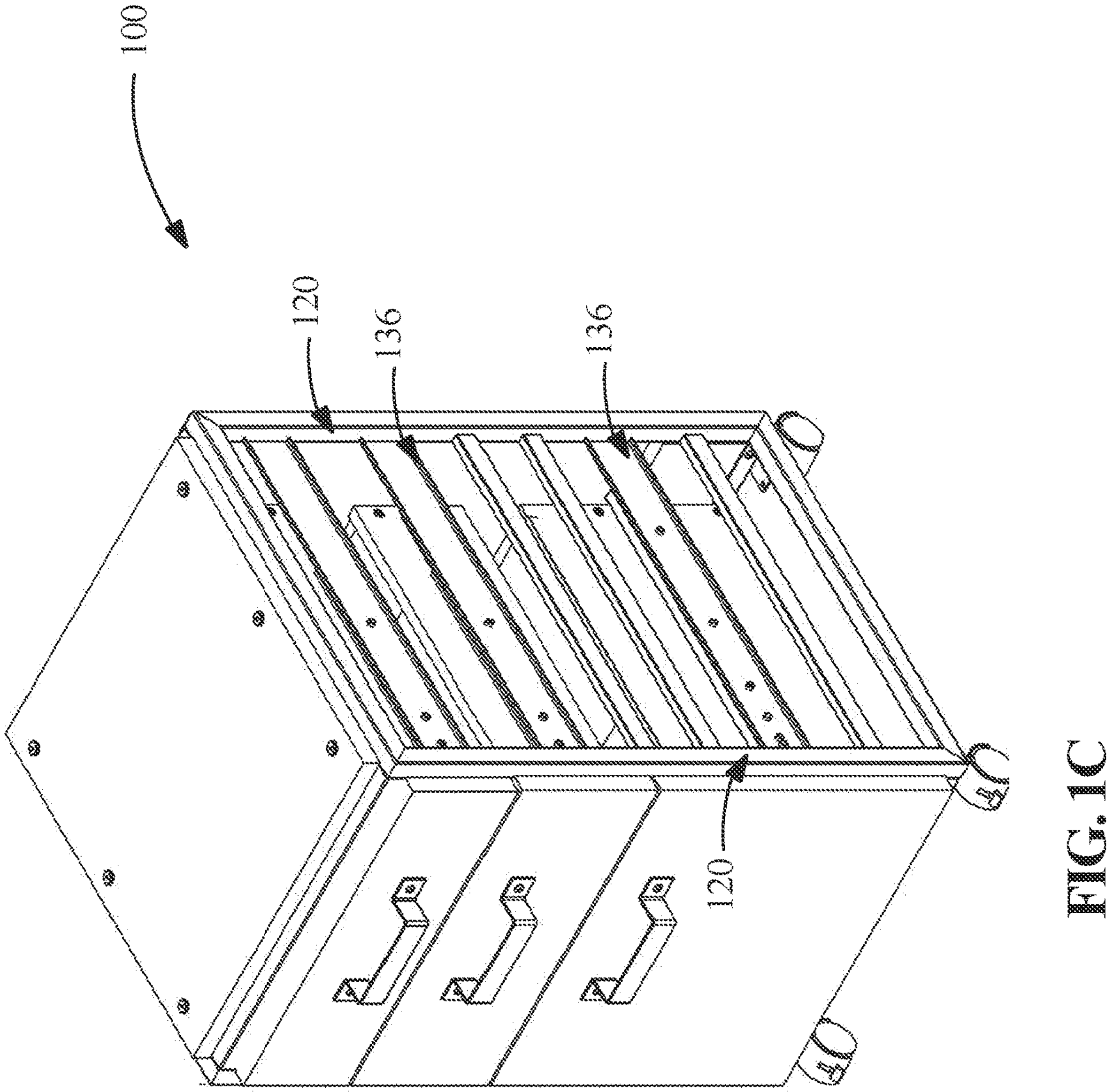

Referring now to FIG. 1A-1C, an exemplary embodiment of a modular component configuration using the mounting apparatus for furniture is illustrated. As used herein, a “modular component” refers to a standardized or interchangeable building block or unit that is designed to be combined with other similar components to create various furniture configurations. At least a modular component 104 configuration may include at least a side wall 108, base 112, door, and the like. "Base," for the purposes of this disclosure, is a structural element configured to provide support at a bottom of a modular component. Base 112 may be configured to provide structural support for modular component. In some cases, base 112 may include one or more materials. One or more materials, may include, but is not limited to, wood, metal, glass, plastic, carbon fiber, a carbon fiber composition, a composition of one or more materials and the like. In some cases, one or more materials may be comprised of a pliable material and/or a non-pliable material. "Sidewall" for the purposes of this disclosure is a structural element configured to provide support on a left or right side of modular component. In some cases, first sidewall 108 may be fixedly attached to base 112. In some cases, sidewall 108 may include one or more materials as described above. In some cases, sidewall 104 may extend orthogonally to base 112 wherein sidewall 108 may extend in a direction perpendicular or substantially perpendicular to base 112. In some cases, a first end of first sidewall 108 is connected to a first end of base 112. In some cases, sidewall 108 may be removably attached to base 112 through one or more mating mechanisms. In some cases, one or more mating mechanisms may include screws, bolts, snap lock mechanisms, twist lock mechanisms and the like. In some cases one or more mating components may include male grooves that are configured to be inserted into a receiving female receiving groove. Groove may include a tongue and groove, a half lap, a rabbet joint, a biscuit joint, a dowel joint, a dado going, an ordinary male groove and the like. In some cases, sidewall 108 and/or any other structural elements may be fixedly attached to modular compartment assembly. Fixedly attached may include the use of one or more adhesives, the use of nails, welding one or more structural components together, riveting, stitching and the like.

Modular compartments may comprise a cabinetry system. Modular components may be removed so that functionalities, colors, door styles, entire outer surface and the like may be altered, updated or changed. Modular components may be mounted to a wall or other flat surface using the mounting apparatus described in this disclosure. Mounting apparatus may be used to combine modular compartments together. Mounting apparatus may allow for modular components to be removably attached to the wall or other flat surface. Mounting apparatus may be attached to the wall or flat surface using any methods described in this disclosure. Additional disclosure related modular compartments may be found in U.S. patent application Ser. No. 18/389,372 filed on Nov. 14, 2023, and entitled "Modular Compartment Assembly and Method of Use," the entirety of which is incorporated herein by reference.

Referring now to FIG. 1A, apparatus 100 may include at least a casing 116. As used herein, at least a casing 116 refers to a skin that covers the outer portion of the modular component. At least a casing 116 may include molding. At least a casing 116 molding may be removably attached to the at least a casing 116. The molding may be customizable and designed to a user's personal preference. The molding may enhance the at least a casing's visual appeal and adaptability. At least a casing 116 may be colored. Colors for the at least a casing may be customizable. Colors may include red, green, blue, yellow, and the like. Casing may have personalized colored designs. Colors for the at least a casing may be interchanged. At least a casing 116 may be made of different materials such as plastic, wood, glass, metal, ceramic, stone, rubber, synthetic fabrics, and the like. The at least a casing may be easily reconfigurable to accomplish different design styles seamlessly. The at least a casing 116 may have functional components, such as operating as a whiteboard. The at least a casing may only be aesthetically functional. The at least a casing 116 may be a protective outer layer of the at least a modular unit to diminish the look of scratches, stains and the like. The at least a casing 116 may be connected to the at least a modular component magnetically. The at least a casing may be connected to the at least a modular component using glue, adhesives, and the like. The at least a casing 116 may define the external appearance of different components of the at least a modular component. For example, a casing for a door may be different than the casing for a side wall, or another modular component's door. In another non-limiting embodiment, at least a casing 116 may be connected to the at least a modular component using screws, nails, spring and magnet releases, and the like. At least a casing may be connected using corner brackets, which involve securing at least casing or modular component at their corners. Connection made include through-bolts which pass bolts through adjacent modular component sides and may be further secured with nuts. Wooden cleats may be used to attach casing to modular component sections. At least a casing may be connected to the at least a modular component using cam locks and dowels.

Referring now to FIG. 1B-1C, In one or more embodiments, apparatus 100 includes one or more structural components 120. For instance, and without limitation, apparatus 100 may include a plurality of structural components 120. As used in the current disclosure, a "structural component" is an element that contributes to the overall strength, stability, and functionality of the furniture piece. At least a modular component 104 may include structural components 120. It provides the necessary support and framework upon which the rest of the furniture is built. A plurality of structural components 120 may be made from wood, plastic, glass, metal, fiberglass, polymers, heat resistive materials, and/or any combination thereof. In an embodiment, a structural component 120 may be a separate component attached to a piece of furniture. In another embodiment, a structural component 120 may be integrated into a piece of furniture. For example, a structural component 120 may be integrated into the frame of a piece of furniture.

With continued reference to FIG. 1B-C, structural components 120 may be any structural member of at least a modular component. Structural member may also be used for furniture. As used in the current disclosure, "furniture", or a "piece of furniture", is an article intended to support various human activities. For instance, and without limitation, furniture may include equipment used for equipping a living space. In one or more embodiments, activities may include seating, eating, storing items, working, sleeping, and the like. Furniture may include, for example and without limitation, cabinetry, dressers, nightstands, storage units, food storage units, armoires, closets, and the like. Furniture may include any movable or immovable furniture. This may include movable or immovable cabinetry or shelving, such as modular component 104. In one or more embodiments, moveable furniture may include furniture with wheels attached to its base. For example, and without limitation, moveable furniture may include a mobile closet or dresser. In one or more embodiments, immovable furniture may include integrated furniture. For example, and without limitation, unmovable modular component 104 may include a built-in storage unit that is permanently attached to a property's interior, such as a structure of a building (e.g., a wall). In various embodiments, modular component 104 may include a frame. In one or more embodiments, structural component 120 may be included within or integrated into a frame of a piece of furniture. As used in the current disclosure, a "frame" is a basic structure that provides a shape of the furniture. Frame may include a fundamental component to which additional components or features may be added. Frame may be configured to support any live loads and/or dead loads associated with the piece of furniture. For instance, and without limitation, structural components 120 may include a vertical portion of the frame. In another instance, and without limitation, structural components 120 may include vertical components configured to be either fixed or removably secured to frame. In other instances, and without limitation, structural components 120 may include horizontal components of frame. In another instance, and without limitation, structural components 120 may include a horizontal component configured to be either fixed or removably secured to frame. Structural components 120 may be attached to frame, permanently or selectively, using various mechanisms, adhesives, fasteners (e.g., screws, anchors, clamps, nails, nuts, bolts, rivets, pins, sockets, washers, hangers, and the like), or other securing mechanisms. The vertical components of the furniture may include one or more legs, sidewalls, posts, top surfaces, bottom surfaces, and the like. Legs may be found in tables, chairs, and various other furniture items. Legs provide stability and balance, clearance between a component of the furniture and the ground, and even weight distribution of the furniture. Legs may be composed of various materials, such as wood, wood composite, metal, metal alloys, polymers such as plastic, or other rigid materials. Structural components 120 may also include posts or uprights. In certain types of furniture, especially those with taller structures, posts or uprights serve as vertical supports. In some embodiments, structural component 120 may include a vertical divider. In an non-limiting example, in bookshelves, cabinets, and storage units, vertical dividers may act as supports that separate and stabilize the shelves or compartments. For instance, and without limitation, vertical dividers may prevent sagging and distribute the weight of the stored items evenly.

With continued reference to FIG. 1B-1C, plurality of structural components 120 may include a first structural component 124 and a second structural component 128. As used in the current disclosure, a "first structural component" is a structural component located on a fore end of a piece of furniture or modular unit. First structural component 124 is discussed in greater detail in FIGS. 3A and 3B. As used in the current disclosure, a "second structural component" is a structural component located on the aft end of the piece of furniture or modular unit. Second structural component 128 is discussed in greater detail in FIGS. 4A and 4B. Fore end of furniture may refer to a front section or a forward-facing part of the furniture. For instance, and without limitation, fore end may include a portion of furniture, or modular component, that is most visible and accessible from the front or the primary viewing angle. In some aspects, a fore end of furniture, or modular component, may include a surface providing a design or overall aesthetics of the furniture or modular component. For instance, and without limitation, in regards to storage units, such as cabinets or closets, fore end may include a front-facing section that provides access and functionality with doors, drawers, and/or compartments. For example, and without limitation, fore end may include a portion of furniture that is used for accessing and storing items. In one or more embodiments, aft end of furniture refers to the rear or backside of furniture. For example, and without limitation, the aft end may be a portion of furniture that abuts or faces a wall of structure on an interior of a dwelling. Aft end of furniture may be located opposite of the fore end of the furniture piece. In one or more embodiments, furniture may include one or more cavities, which may be defined by the fore end, aft end, and one or more side walls of furniture.

With continued reference to FIG. 1B-1C, structural components 120 may include one or more connective receptacles 132. For instance, and without limitation, structural components 120 may each include a plurality of connective receptacles. As used in the current disclosure, a "connective receptacle" is an opening configured to receive a protrusion or a portion thereof to facilitate a connection between various elements of the at least a modular component. Connective receptacle 132 may include an opening configured to facilitate interlocking mechanisms, fasteners, clamps, latches, hooks, magnetic connections, rail systems, modular joinery, slotted openings, and the like. Each connective receptacle may be recessed or disposed within a surface of structural component 120. For instance, and without limitation, connective receptacle 132 may include a notch or slot disposed within a surface of structural component, as discussed further in this disclosure. Opposing connective receptacles 132 may allow two or more structural elements to fit together securely. In one or more embodiments, connective receptacle 132 may be configured to receive a fastener or a portion thereof, such as, for example, a screw, bolt, hook, dowel, or other male connector. Connective receptacles 132 may include a plurality of notches. As used in the current disclosure, a "notch" refers to a cut or indentation made on a structural components 120 or another material to create a specific joint or connection with another piece of wood. Notches are commonly used in woodworking to join pieces together securely, providing stability and strength to the overall furniture piece. Notches may include a dado notch, mortise and tenon notch, half-lap notch, rabbet notch, dovetail notch, and the like. Connective receptacles 132 may include a plurality of slots. As used in the current disclosure, a "slot" refers to a type of joint used in joinery, which is the process of connecting different structural components 120 to rails 136. Slots are commonly used to assemble various parts of furniture, ensuring a secure fit and facilitating the overall construction process. There are different types of slots, each with its unique characteristics and applications.

With continued reference to FIG. 1B-C, connective receptacle 132 may facilitate various types of connections. Each of the connections may be used to removably attach the first structural component and the second structural component to the rail 136. As used in the current disclosure, "removably attached" refers to a method of connecting or fastening two or more objects together in a way that allows them to be easily separated or detached without causing damage or permanent alterations to the objects involved. The removably attached components can be taken apart and reassembled as needed, providing flexibility and convenience for various applications. This type of attachment is commonly used in furniture, appliances, electronics, and other products that may require disassembly for maintenance, transportation, or customization purposes. Examples of the types of connections that are facilitated by the connective receptacles include a bolted connection, slotted connection, hook and eye connection, dowelled connection, interlocking connections, and the like. In some cases, the connection associated with the connective receptacle 132 may include a mating connection. As used in the current disclosure, a "mating connection" is a type of mechanical connection or assembly between two or more components, where the parts are designed to fit together precisely and securely to form a cohesive and functional unit. The mating connection is achieved through the careful design and alignment of mating surfaces, ensuring that the parts fit together with minimal play or clearance.

Still referring to FIG. 1B-1C, a structural component 120 may be attached to a base. A base may be configured to provide structural support for a modular component assembly. In some cases, base may include one or more materials. One or more materials may include, but is not limited to, wood, metal, glass, plastic, carbon fiber, a carbon fiber composition, a composition of one or more materials and the like. In some cases, one or more materials may include a pliable material and/or a non-pliable material. In some cases, base may include a hollow core. In some cases, a hollow core may allow for transmission of cables and/or other components through the hollow core. In some cases, hollow core may allow for the transmission of electrical cables through one section of base to another section. In some cases, the electrical cable may transmit electricity to one or more areas of base.

With continued reference to FIG. 1B-1C, apparatus 100 includes a rail 136. As used in the current disclosure, a "rail" is a structural component is a that is configured to connect the first structural component 124 and the second structural component 128 within the at least a modular component. A rail may be configured to be oriented substantially in a horizontal manner. Rails 136 may be responsible for distributing the weight of the load placed on the furniture or modular component and preventing sagging or deformation. Rails are essential for ensuring the overall durability and functionality of the furniture. A rail 136 may be mechanically connected to both a structural component 120 and a bracket 144. In an embodiment, a rail 136 may include a plurality of mating surfaces. The connection between the rail 136 and the structural component may be facilitated using a mating surface. As used in the current disclosure, a "mating surface" is a surface that is configured to mate with a connective receptacle 132. A mating surface refers to a flat or contoured area on an object that is designed to fit precisely with another corresponding surface to create a secure and accurate connection. A mating surface may be configured to facilitate a mating connection with the plurality of structural components. In an embodiment, a mating surface may include a male or a female connection. When two components or parts are intended to be joined together, the components must have mating surfaces that align perfectly, ensuring a proper fit and functionality of the assembly. In a non-limiting example, a mating surface may include a protrusion configured slide into the connective receptacles 132 as shown in FIG. 1B-1C. The protrusion may be a flange configured to mate with the connective receptacles 132. In another embodiment, the mating surface may be a one or more engagement members as described in greater detail herein below. In some embodiments, the rail 136 may include a slide. The slide may be a portion the telescoping feature as mentioned herein below. The slide may include a mounting member and an extending member. The extending member may be a selectively extendable piece of the rail. The extending member may be configured to be mechanically affixed to a drawer. The mounting member is a portion of the rail that is configured to support the extending member.

With continued reference to FIG. 1B-1C, a rail 136 may include a telescoping feature. A "telescoping feature," for the purposes of this disclosure, is a feature that allows for extension or retraction of one or more components of rail 136. A telescoping feature associated with a rail 136 refers to a design mechanism that allows the rail 136 to extend or slide out in multiple stages or levels, providing increased access and visibility to the contents inside. The telescopic feature may be configured to out of the furniture piece when extended. This telescopic movement is achieved through the use of specific hardware components, such as telescopic slides or glides, which facilitate the smooth extension and retraction of the rail 136. In an embodiment, a telescoping feature may include a plurality of telescopic slides. These slides consist of two or more sets of nested rails that fit into each other like a telescope, hence the name "telescopic." Each set of rails includes an inner member and an outer member. In another embodiment, telescopic feature may include telescopic slides. The telescopic slides may be designed to allow the rail 136 to extend in multiple stages. When the rail 136 is not extended, the outer and inner members of the slides are nested together, keeping the rail 136 within the cabinet or furniture piece. In some embodiments, the rail 136 may be configured to include a soft close feature. As used in the current disclosure, a "soft close feature" is an apparatus that provides a gentle and controlled retraction of the rail 136. This prevents the rail 136 from slamming shut, reducing wear, and tear and offering a quieter operation. This feature uses specialized hardware, such as hinges or slides, to control the closing action, bringing the rail 136 to a smooth and controlled stop just before it fully closes. It then gently eases the door or drawer into its fully closed position. The soft-close feature may use specialized hardware designed to slow down the closing action. In an embodiment, the hardware may include soft close hinges or soft close slides.

With continued reference to FIG. 1B-C, a rail 136 may be mechanically connected to a storage platform. A rail 136 may be configured to be to support the weight of storage platform. As used in the current disclosure, a "storage platform" is an that is configured to support storage of various items. Storage platform may be contained with the at least a modular component. A storage platform may include a drawer, shelf, rotating storage platform, cubbies, bins, baskets, and the like. In an embodiment, two or more rails 136 may be attached to each storage platform. A storage platform may be located within a cavity of a furniture piece. In some cases, a storage platform may include a removable drawer. "Removable," for the purposes of this disclosure, refers to the capability of separating one or more components without causing damage to either component. For example, a drawer may be removable from a dresser whereas a wall of the dresser may not be removable if the walls are nailed together. In some cases, modular compartment apparatus 100 may be configured to hold one or more storage platforms.

With continued reference to FIG. 1B-C, a telescoping feature may include a sliding rail system. Sliding rail system (sometimes known as linear rail and track systems) may be configured to allow for linear extension of rail 136. In some cases, sliding rail system may allow for ease of access of one or more items located within on a storage platform. In some cases, sliding rail system may allow for an opening of drawer, and/or linear extension of tray from within modular compartment of a piece of furniture. In some cases, a piece of furniture may consist only of a tray, wherein the tray may be configured to hold one or more items. In some cases, both tray and drawer may contain sliding rail system or a telescopic feature. The tray and/or the drawer may be configured to be mechanically attached to the rail 136, wherein tray/drawer extend a first distance from rail 136.

With continued reference to FIG. 1B-1C, apparatus 100 may include an adjustable storage system. As used in the current disclosure, an "adjustable storage system" is a system used to selectively alter the height or location of a storage platform. An adjustable storage system may be used to adjust the height of the storage platform within the piece of furniture. The adjustable storage system may be adjusted by mating the rail 136 and bracket 200 to various connective receptacles 132 with various heights. Wherein each rail 136 and bracket 200 may be removably attached to the connective receptacles 132 of the structural components 120. In an embodiment, the mating component of the connective receptacle 120 may mated with a connective receptacle 132 a second structural member 128, wherein the engagement members of the bracket 200 is mated tot the connective receptacles of the first bracket 108. Each of the connections may be configured to be at the same.

With continued reference to FIG. 1B-C, rail 136 may include one or more apertures. As used in the current disclosure, an "aperture" is an opening or hole that receives at least a portion of bracket 144. It serves as a point of interface where the two components can be linked, secured, or joined together using various methods or fasteners. Connective apertures are commonly found in the design of mechanical and structural components, allowing for assembly, disassembly, or customization of various objects and systems. A connective aperture 140 may be configured to facilitate connection between a rail 136 and a bracket 200. This connection may include any connection mentioned herein throughout the entirety of this disclosure, including a bolted connection. In an embodiment, a connective aperture 140 may be configured to align with the connective openings of bracket 144. In an embodiment, each connective aperture 140 may be configured to be a circle or an oval in shape. In other embodiments, the plurality of connective aperture 140 may be configured to aligned uniformly in a first row, second row, up to an nth row.

With continued reference to FIGS. 1B-C, apparatus 100 may include one or more brackets. As used in the current disclosure, a "bracket" is a component used to connect two or more members. A bracket may be made of a plurality of materials. A bracket may be configured to be made of wood, metal, plastics, polymers, glass, stone, or any combination thereof. In an embodiment, bracket 144 may be heat resistive, chemical resistive, rust resistive, water resistive, corrosion resistive, and the like. Bracket 144 may be configured to have a plurality surfaces. The each of the plurality of surfaces may be configured to have an interior surface, an exterior surface, a top surface, a bottom surface, a left surface, and a right surface. Bracket 144 may the same or substantially similar to the bracket of FIG. 2.

Referring now to FIGS. 2A-E, a plurality of exemplary embodiments of bracket 200. Bracket 200 may include a first surface 204, a second surface 208, a third surface 212, a fourth surface 216, up to an nth surface. The first surface 204 and the second surface 208 may be a retinacular prism or a cuboid shape. In some embodiments, the first surface 204 and the second surface 208 may both be substantially similar in size. The first surface 204 and the second surface 208 may fit together in "L"-shaped formation, forming a perpendicular angle between the two surfaces. The interior corner which forms the connection between the first surface 204 and the second surface 208 may include a beveled corner or rounded corner. The beveled corner may be configured to be beveled up to 180 degrees. The plurality of surfaces may have various dimensions. For example, the first surface 204 and the second surface 208 may be configured to be between 12-25 mm wide and 25-100 mm tall, and 2-20 mm thick.

Figures 2A, 2B, 2C:
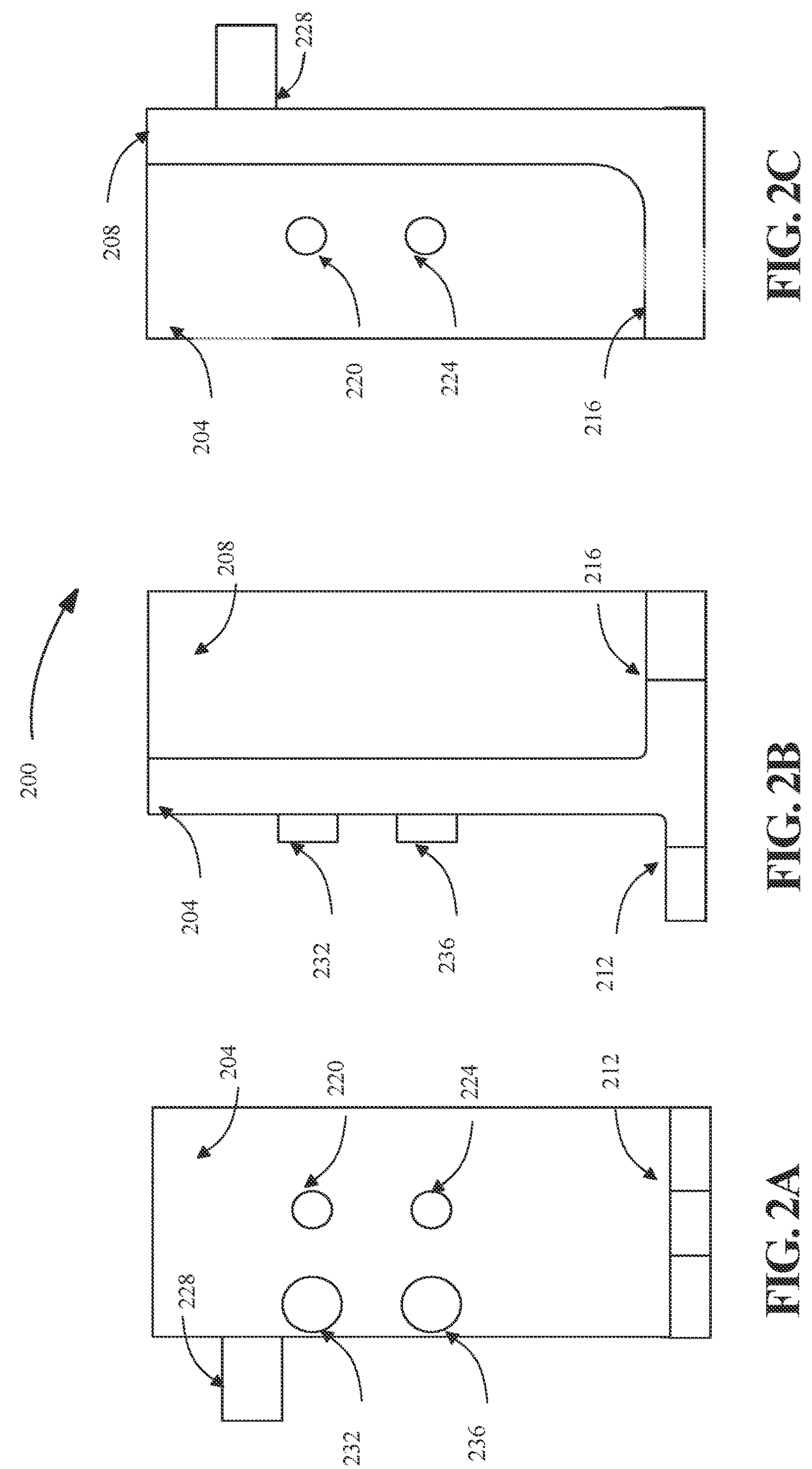
FIGS. 2A-2E are exemplary embodiments of a bracket in accordance with one or more embodiments of the present disclosure.

Still referring to FIG. 2B, the plurality of surfaces may include a third surface 212. The third surface may mechanically connected to the first surface 204. The third surface 212 may be connected to the bottom of the first surface 204. The first surface 204 and the third surface may be connected in a perpendicular manner. As used in the current disclosure, a connection executed in a "perpendicular manner" refers to joining two components or objects at a 90-degree angle to each other, creating a right angle. This type of connection is commonly used in various applications, including woodworking, construction, metalworking, and engineering, to create stable and precise junctions between components that are oriented perpendicularly to each other. The third surface 212 may be configured to be a retinacular prism. This retinacular prism may be configured to have beveled or rounded corners. The beveled corner may be configured to be beveled up to 180 degrees. The third surface 212 may be configured to be between 10 mm-50 mm wide and between 2 mm and 10 mm tall. The third surface 212 may be configured to extend from the first surface 204 between 5 mm and 25 mm. In some embodiments, the rail 136 of FIG. 1 may be configured to rest on top of the third surface 212.

Still referring to FIG. 2B, the plurality of surfaces may include a fourth surface 216. The fourth surface 216 may be configured to be placed between the first surface 204 and the second surface 208 in a perpendicular manner. The forth surface 216 may be configured to be to be flush with the bottoms of the first surface 204 and the second surface 208. The intersection between the first surface 204, second surface 208, and fourth surface 216 may be configured to be rounded. The fourth surface 216 may be configured to be a retinacular prism. This retinacular prism may be configured to have beveled or rounded corners.

Still referring to FIG. 2A, bracket 200 may be configured to have a plurality of connective openings. As used in the current disclosure, a "connective opening" is an opening used to facilitate connection of one member to another member. A connective opening May include a first connective opening 220 and a second connective opening 224. Each connective opening may be configured to pass directly through one of the plurality of surfaces. For example, a first connective opening 220 and a second connective opening 224 may be configured pass completely through the first surface 204. In an embodiment, the first connective opening may be configured to facilitate a bolted connection to the connective apertures 140 to the rail 136. As used in the current disclosure, a "bolted connection" is a type of mechanical joint used to fasten two or more components together securely. Bolts are the main fasteners used in a bolted connection. Bolts are usually made of steel and come in different sizes and grades, depending on the required strength of the connection. The shank of the bolt may include as cylindrical shape, and, at one end, the shake may include external threads (e.g., helical threads). The other end might have a head of various shapes, such as hexagonal, square, or round. Nuts may be used in conjunction with bolts to secure the joint. Nuts are internally threaded and fit onto the threaded end of the bolt. When tightened, the nuts apply pressure and hold the connected components together.

Washers are flat, usually circular, metal discs placed between the nut and the connected components. Washers help distribute the pressure evenly and prevent damage to the surfaces of the components. Washers can be plain or have specific designs, such as spring washers, which provide additional resistance against loosening. The connective openings of the bracket 200 may be configured to align with connective openings of the rail 136. This may allow bolts to pass directly through the first surface 204 and the rail 136 thus facilitating a bolted connection.

Figure 2E:
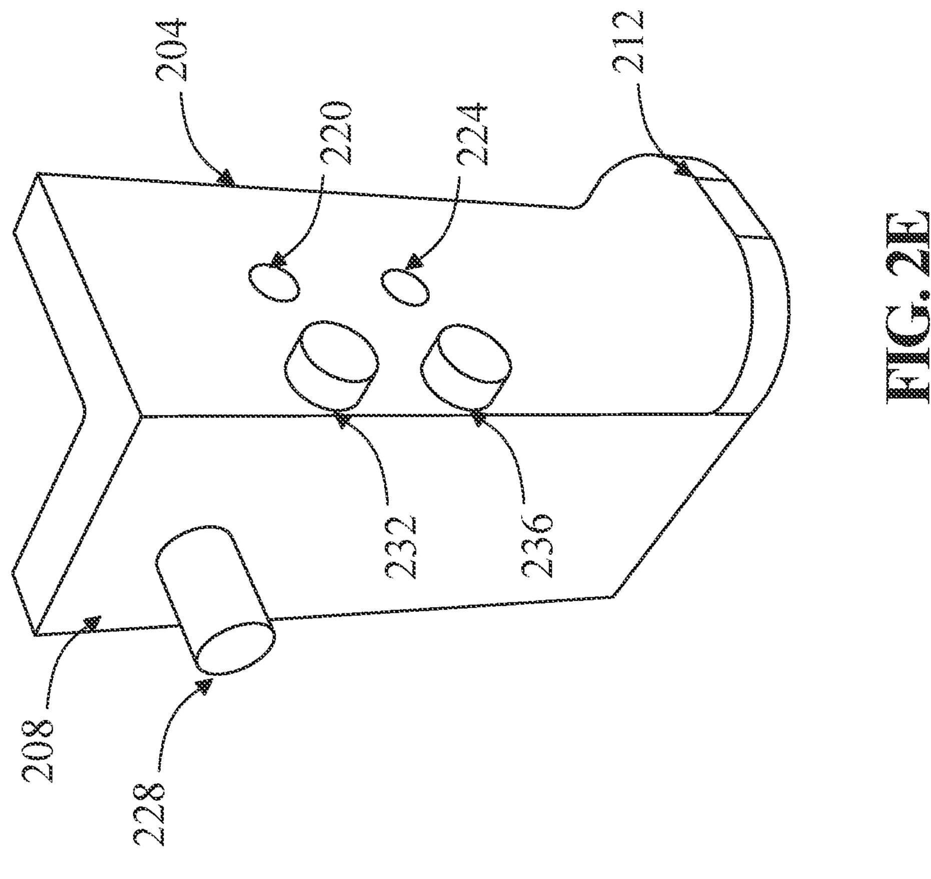
Figure 2D:
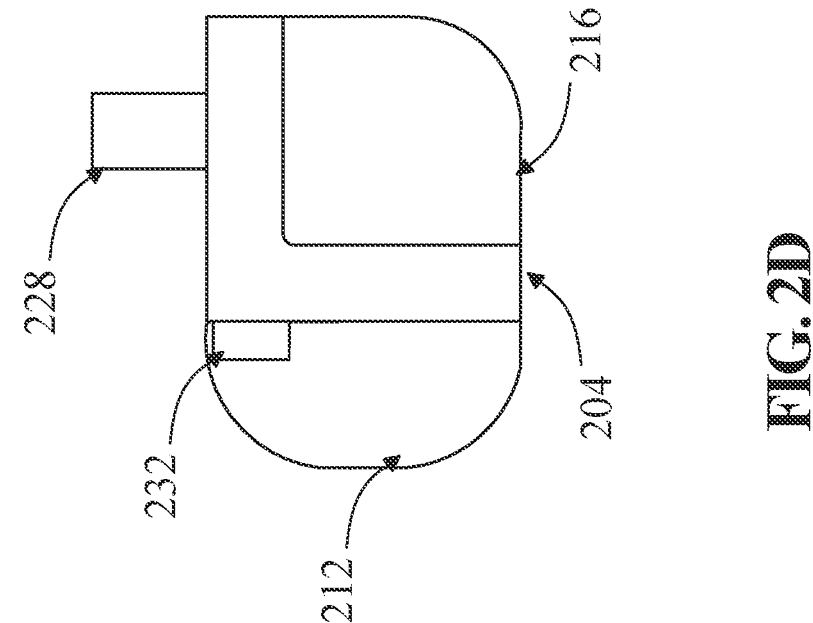

Still referring to FIG. 2E, bracket 200 may include a plurality of protrusions. As used in the current disclosure, a "protrusion" is a cylindrical rod or pin used to connect bracket 200 to a member. A protrusion may be cylindrical in shape, meaning it has a uniform diameter along its length. The protrusions may have a round cross-section shape, but in some embodiments can also be hexagonal, fluted, or have other specialized designs for specific applications. In a embodiment, protrusions may be paired to matching holes or connective receptacles that are drilled or machined into the pieces of material to be joined. The protrusions may be inserted into the holes, connecting the pieces together. In some cases, glue may be applied to the dowel before insertion, creating a strong bond between the dowel and the surrounding material. The plurality of protrusions include a first protrusion 228, a second protrusion 232, a third protrusion 236, up to an nth protrusion. The each of the protrusions may be configured to connect to one of the a plurality of structural components 120, as shown in FIG. 1. In an embodiment, the first protrusion 228 may be configured to be between 5-15 mm long. The first protrusion 228 may additionally have a radius between 4-10 mm. In a non-limiting example, the first protrusion 228 may be configured to be mechanically connected to the second surface 208. In another non-limiting example, the second protrusion 232 and the third engagement member 236 may be connected to the first surface 204. The second protrusion 232 and the third protrusion 236 may be configured to be aligned along the first surface 204. This may include a vertical or horizontal alignment.

Figures 3A, 3B:
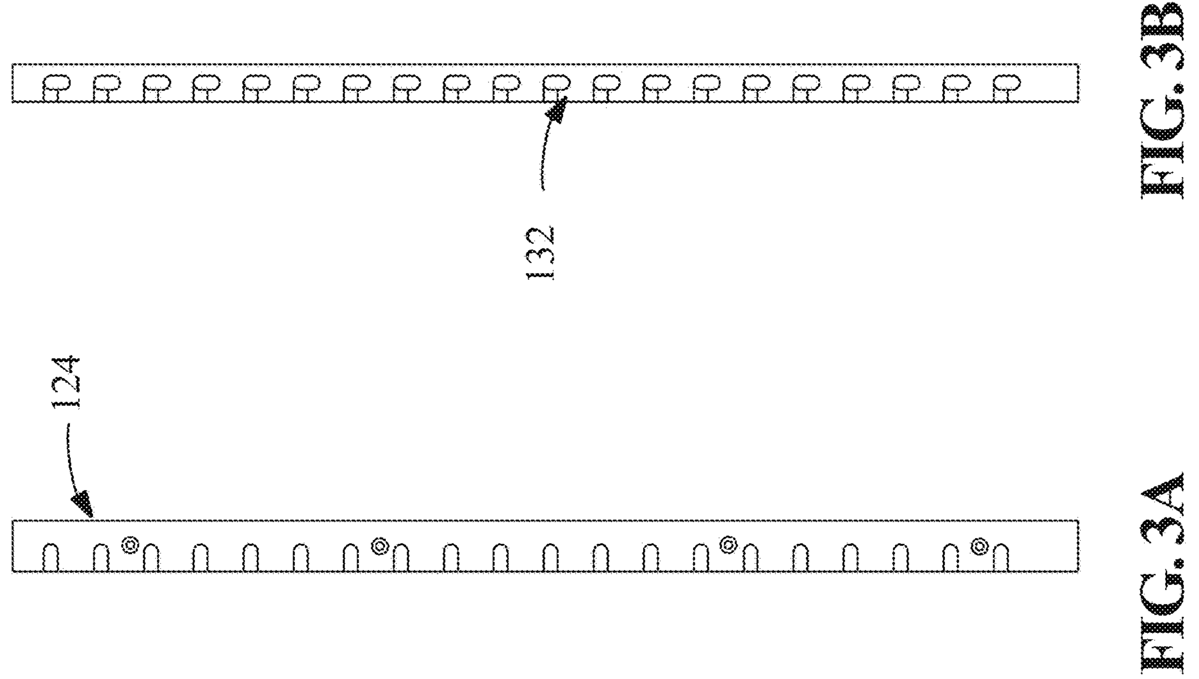
FIGS. 3A-3B are exemplary embodiments of a first structural component in accordance with one or more embodiments of the present disclosure.

Referring now to FIGS. 3A-B, an exemplary embodiment of a first structural component 124. A first structural component 124 may be configured to be mechanically connected to bracket 200 using a dowel connection. As used in the current disclosure, a "dowel connection" is a type of mechanical joint that involves using cylindrical pins or dowels to connect two or more components together. A first protrusion 228 may be made of wood, metal, or plastic and are inserted into corresponding holes in the components to create a secure and precise connection. This type of connection is commonly used in woodworking, furniture assembly, cabinetry, and other applications where a strong and reliable joint is needed. The first protrusion 228 may be configured to mate with the connective receptacles 132 of the first bracket. In an embodiment, the connective receptacles 132 associated with first structural component 124 may be configured to include a slide and drop opening. As used in the current disclosure, a "slide and drop opening" is a type of connective receptacle 132 used to join two components together by sliding one component into the other and then allowing it to drop or settle into a locked position. As used in the current disclosure, a "locked position" refers to a position where something is securely fixed, immobilized, or prevented from moving or changing. In an embodiment, a first protrusion 228 may be configured to be placed in the locked position when it is placed in the "dropped" portion of the connective receptacle 132. An unlocked position may include a position wherein the first protrusion 228 may not be located in a dropped position. The components to be connected are designed with specific features that enable the dowelled connection. One component typically has a groove or channel or other female component, while the other has a protruding tab, tongue, dowel, or other male component that fits into the groove. A dowelled connection is a type of mechanical connection used to join two components together by sliding one component into the other and then allowing it to drop or settle into a locked position. This type of connection is commonly used in furniture assembly and construction, as it offers a quick and easy way to join components without the need for additional hardware or tools. Once the first protrusion 228 is fully inserted into the groove or channel, the first protrusion 228 is allowed to drop or settle into the locked position. The connection becomes secure, holding the components together without the need for additional fasteners. In an embodiment, the opening may include an oval shaped opening.

Figure 4B:
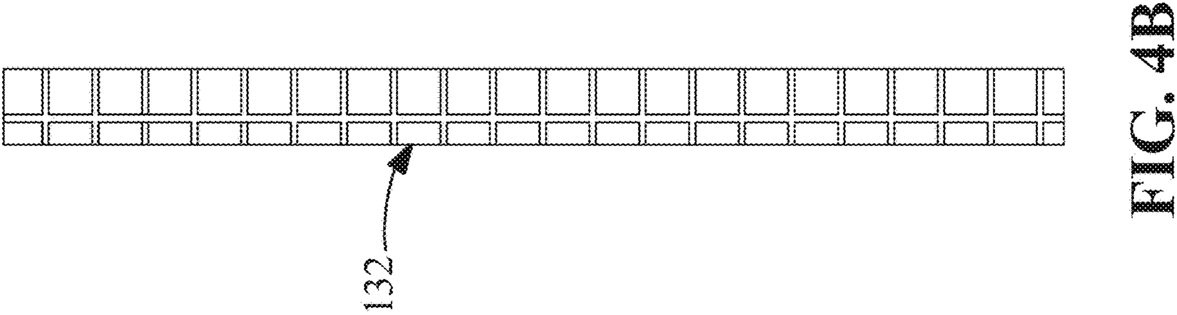
FIGS. 4A-4B are exemplary embodiments of a second structural component in accordance with one or more embodiments of the present disclosure.
Figure 4A:
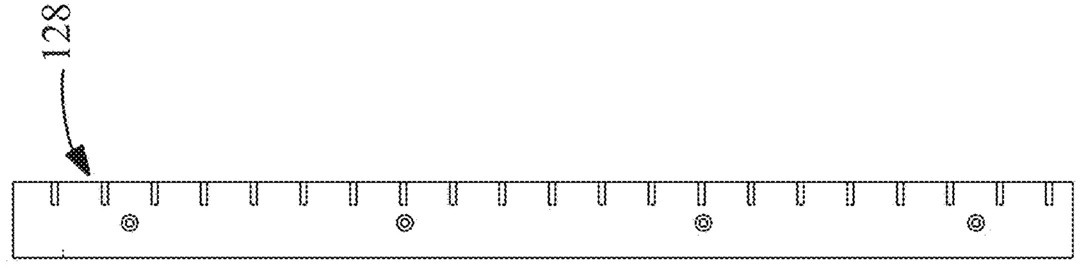

Referring now to FIGS. 4A-B, an exemplary embodiment of a second structural component 128. A second structural component 128 may be configured to be mechanically connected to rail 136 using a slotted connection. As used in the current disclosure, a "slotted connection" refers to a method of connecting or fastening two or more components together using slots or channels in the objects that interlock with each other. The slots are typically narrow, elongated openings that allow for a secure connection while still providing some degree of adjustability and flexibility. Slotted attachments are commonly used in various applications, ranging from furniture and machinery to construction and engineering. In an embodiment, the connective receptacles 132 associated with second structural component 128 may be configured to include a slotted opening. As used in the current disclosure, a "slotted opening" refers to an elongated or narrow opening or hole with specific dimensions and shape that is designed to accommodate a particular type of object or component. The term "slotted" indicates that the opening has a slot-like structure, which means it is longer in one dimension compared to its width. In an embodiment, a slotted opening may be configured to mate with the mating component of the rail 136. For example, the male mating component of the rail may be configured to slide into the female slotted opening of the second structural component 128.

Figure 5:
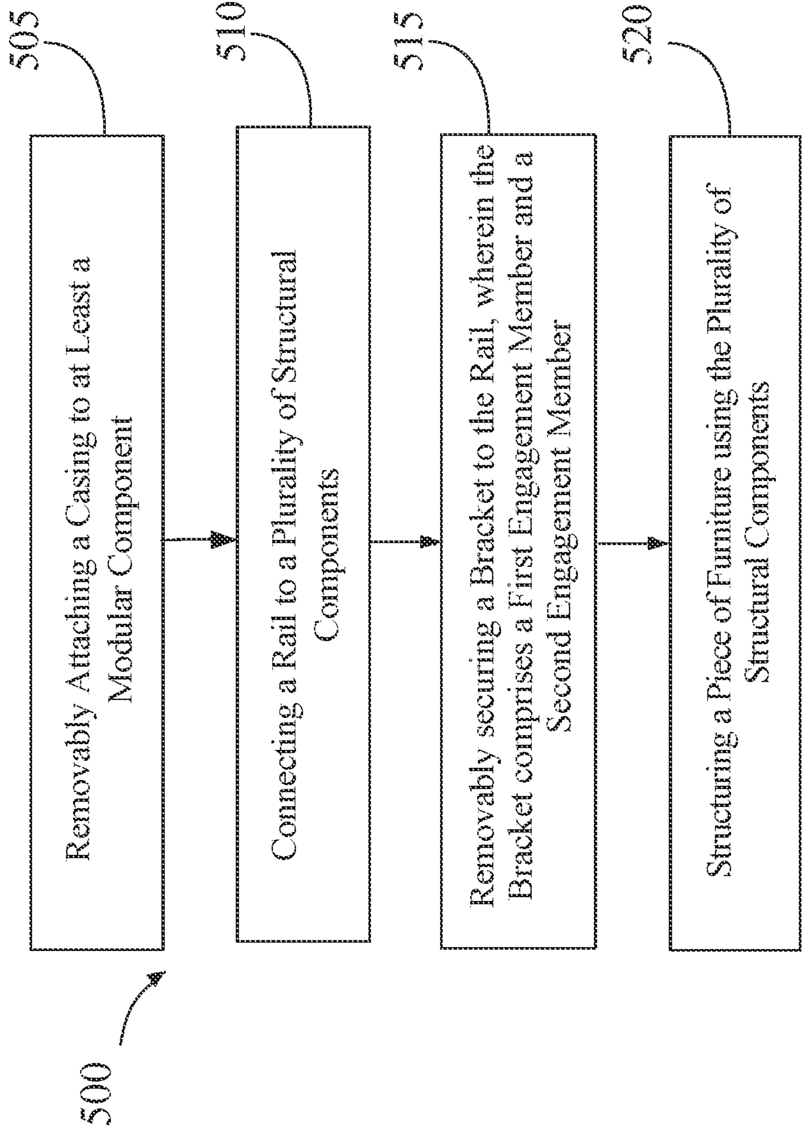
FIG. 5 is a flow diagram illustrating an exemplary work flow in accordance with one or more embodiments of the present disclosure.

Referring now to FIG. 5, a flow diagram of an exemplary method of use 500 for a method of use for a modular component with a mounting mechanism. At step 505, method 500 includes removably attaching a casing to at least a modular component. This may be implemented as described and with reference to FIGS. 1A-4B. In an embodiment, the casing includes molding. In another embodiment, the at least a casing is located on the outer surface of the at least a modular component.

Still referring to FIG. 5, at step 510, method 500 includes connecting a rail to a plurality of structural components. The rail comprises a proximal end comprising a plurality of apertures and a distal end comprising a mating surface. This may be implemented as described and with reference to FIGS. 1A-4B. In an embodiment, the rail may include a slide having a mounting member and an extending member, wherein the extending member is moveably attached to the mounting member. The extending member may be connected to a drawer. In an embodiment, the proximal end of the rail may include an edge, wherein the edge is disposed at least partially within a first slot of the plurality of slots. In an embodiment, the plurality of notches may be configured to facilitate a slide and drop connection with the bracket. In another embodiment, the plurality of notches may be configured to facilitate a slotted connection to the mating surface.

Still referring to FIG. 5, at step 515, method 500 includes removably securing a bracket to the rail, wherein the bracket comprises a first engagement member and a second engagement member, wherein the first engagement member is configured to engage the plurality of apertures of the rail to removably secure the bracket to the rail. This may be implemented as described and with reference to FIGS. 1A-4B. In an embodiment, the first engagement member comprises one or more protrusions, wherein at least a portion of the each of the one or more protrusions is received by a corresponding aperture of the plurality apertures to removably secure the bracket to the rail. In another embodiment, the bracket includes a first surface including the one or more protrusions, a second surface including a plurality of holes, wherein the second surface is substantially perpendicular to the first surface, and wherein the bracket may be removably secure to the rail and the first structural component, the first surface abuts the first structural component and the second surface abuts the rail. In some cases, bracket may further include a third surface affixed to the first surface.

Still referring to FIG. 5, at step 520, method 500 includes structuring a piece of furniture using the plurality of structural components. The plurality of structural components includes first structural component, the first structural component comprising a plurality of notches configured to receive at least a portion of the second engagement member of the bracket and a second structural component, the second structural component comprising a plurality of slots configured to receive the mating surface of the rail. This may be implemented as described and with reference to FIGS. 1A-4B. In an embodiment, the plurality of structural components may be each configured to fixably attached to a frame of a piece of furniture.

The foregoing has been a detailed description of illustrative embodiments of the invention. Various modifications and additions can be made without departing from the spirit and scope of this invention. Features of each of the various embodiments described above May be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for a modular component with a mounting mechanism wherein the apparatus comprises:

at least a modular component, wherein the at least a modular component comprises at least a casing, wherein the at least a casing is magnetically removably attached to the at least a modular component and comprises a customizable molding and customizable design and color based on a user preference;

a rail comprising:

a proximal end comprising a plurality of apertures; and a distal end comprising a mating surface;

a bracket comprising a first engagement member and a second engagement member, wherein:

the second engagement member is configured to engage the plurality of apertures of the rail to removably secure the bracket to the rail;

the second engagement member comprises one or more protrusions;

at least a portion of each of the one or more protrusions is received by a corresponding aperture of the plurality of apertures to removably secure the bracket to the rail;

the bracket comprises a first surface comprising the one or more protrusions;

the bracket comprises a second surface comprising the first engagement member, wherein the second surface is substantially perpendicular to the first surface; and when the bracket is removably secured to the rail and the first structural component, the second surface abuts the first structural component and the first surface abuts the rail;

a plurality of structural components comprising:

a first structural component, the first structural component comprising a plurality of notches configured to receive at least a portion of the first engagement member of the bracket, the notches having apertures in a surface of the first structural component that is facing toward the proximal end of the rail; and a second structural component, the second structural component comprising a plurality of slots configured to receive the mating surface of the rail.

2. The apparatus of claim 1, wherein:

the distal end and the mating surface do not include a bracket.

3. The apparatus of claim 1, wherein the at least a casing is located on an outer surface of the at least a modular component.

4. The apparatus of claim 1, wherein the at least a casing contains moldings.

5. The apparatus of claim 1, wherein:

the proximal end of the rail comprises an edge; and the edge is disposed at least partially within a first slot of the plurality of slots.

6. The apparatus of claim 1, wherein the plurality of structural components are each configured to fixably attach to a frame of the at least a modular component.

7. The apparatus of claim 1, wherein the plurality of notches are configured to facilitate a slide and drop connection with the bracket.

8. The apparatus of claim 1, wherein the plurality of slots are configured to facilitate a slotted connection to the mating surface.

9. A method of use for a modular component with a mounting mechanism, wherein the method comprises:

removably magnetically attaching a casing to at least a modular component and wherein the casing comprises a customizable molding and customizable design and color based on a user preference;

connecting a rail to a plurality of structural components, wherein the rail comprises:

a proximal end comprising a plurality of apertures; and
a distal end comprising a mating surface;
removably securing a bracket to the rail, wherein:
the bracket comprises a first engagement member and a second engagement member;
the second engagement member is configured to engage the plurality of apertures of the rail to removably secure the bracket to the rail;
the second engagement member comprises one or more protrusions;
at least a portion of each of the one or more protrusions is received by a corresponding aperture of the plurality of apertures to removably secure the bracket to the rail;
the bracket comprises a first surface comprising the one or more protrusions;
the bracket comprises a second surface comprising the first engagement member, wherein the second surface is substantially perpendicular to the first surface; and
when the bracket is removably secured to the rail and the first structural component, the second surface abuts the first structural component and the first surface abuts the rail; and
structuring a piece of furniture using the plurality of structural components, wherein the plurality of structural components comprises:
a first structural component, the first structural component comprising a plurality of notches having apertures facing the proximal end of the rail and configured to receive at least a portion of the first engagement member of the bracket; and
a second structural component, the second structural component comprising a plurality of slots configured to receive the mating surface of the rail.

10. The method of claim 9, wherein:
the distal end and the mating surface do not include a bracket.

11. The method of claim 9, wherein the at least a casing is located on an outer surface of the at least a modular component.

12. The method of claim 9, wherein the at least a casing contains moldings.

13. The method of claim 9, wherein:
the proximal end of the rail comprises an edge; and
the edge is disposed at least partially within a first slot of the plurality of slots.

14. The method of claim 9, wherein the plurality of structural components are each configured to fixably attach to a frame of the at least a modular component.

15. The method of claim 9, wherein the plurality of notches are configured to facilitate a slide and drop connection with the bracket.

16. The method of claim 9, wherein the plurality of slots are configured to facilitate a slotted connection to the mating surface.

17. A method for connecting a plurality of structural components, wherein the method comprises:
structuring, using a plurality of structural components, a piece of furniture, wherein the plurality of structural components comprises at least a first structural component and at least a second structural component;
removably, magnetically, attaching a casing to the piece of furniture, wherein the casing comprises a customizable molding and customizable design and color based on a user preference;
connecting, using a rail, the at least a second structural component using a plurality of connective receptacles, wherein:
the rail further comprises a proximal end comprising a plurality of apertures; and
a distal end comprising a mating surface;
the first structural component comprises a plurality of notches configured to receive at least a portion of the first engagement member of the bracket, the notches having apertures in a surface of the first structural component that is facing toward the proximal end of the rail; and
the second structural component comprises a plurality of slots configured to receive the mating surface of the rail; and
connecting, using at least one bracket, the rail to the at least a first structural component, wherein the at least one bracket comprises a first surface and a second surface connected in a perpendicular manner.

18. The method of claim 17, wherein the bracket comprises a third surface and a fourth surface.

19. The method of claim 18, wherein the third surface is mechanically connected to the first surface in a perpendicular manner.

20. The method of claim 18, wherein the fourth surface is mechanically connected to the first surface and the second surface in a perpendicular manner.

21. The method of claim 17, wherein the at least one bracket comprises a plurality of engagement members.

22. The method of claim 21, wherein the second surface comprises a first said engagement member.

23. The method of claim 21, wherein the first surface comprises a second said engagement member and a third said engagement member.

24. The method of claim 17, wherein the rail comprises a telescoping feature.

25. The method of claim 24, wherein the telescoping feature is mechanically connected to a storage platform.

26. The method of claim 17, wherein each structural component of the plurality of structural components comprises a plurality of said connective receptacles.

* * * * *